United States Patent
Eunice et al.

(10) Patent No.: US 9,635,507 B2
(45) Date of Patent: Apr. 25, 2017

(54) MOBILE DEVICE ANALYTICS

(71) Applicant: International Business Machines Corporation, Armonk, NY (US)

(72) Inventors: Thomas J. Eunice, Studio City, CA (US); Christian E. Loza, Denton, TX (US); Arvind Sathi, Englewood, CO (US); Mathews Thomas, Flower Mound, TX (US); Janki Y. Vora, Dallas, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 656 days.

(21) Appl. No.: 14/089,856

(22) Filed: Nov. 26, 2013

(65) Prior Publication Data

US 2015/0148058 A1 May 28, 2015

(51) Int. Cl.
*H04W 4/02* (2009.01)
*H04W 4/20* (2009.01)

(52) U.S. Cl.
CPC ........... *H04W 4/025* (2013.01); *H04W 4/206* (2013.01)

(58) Field of Classification Search
CPC ....... H04W 4/028; H04W 4/02; H04W 4/025; H04W 4/206; H04W 8/183; H04L 67/306; H04L 67/22; H04L 51/32; G06Q 30/02; G06Q 30/0269; G06Q 50/01; G06Q 30/0261; G06Q 30/0205; G06Q 30/0267
USPC .......... 455/414.1, 414.2, 456.1, 456.2, 456.3
See application file for complete search history.

(56) References Cited

U.S. PATENT DOCUMENTS

| | | |
|---|---|---|
| 2002/0111172 A1 | 8/2002 | DeWolf et al. |
| 2009/0247193 A1 | 10/2009 | Kalavade |
| 2010/0197318 A1* | 8/2010 | Petersen ................ G06Q 10/10 455/456.1 |
| 2011/0071881 A1 | 3/2011 | Zheng et al. |
| 2011/0099142 A1 | 4/2011 | Karjalainen et al. |
| 2011/0167073 A1 | 7/2011 | Rosenberg |
| 2011/0264663 A1 | 10/2011 | Verkasalo |
| 2012/0047448 A1* | 2/2012 | Amidon ............. G06Q 30/0204 715/753 |

(Continued)

OTHER PUBLICATIONS

Bayir, et al., "Discovering Spatio Temporal Mobility Profiles of Cellphone Users", © 2009 IEEE.

*Primary Examiner* — Thai Vu
(74) *Attorney, Agent, or Firm* — Michael LeStrange; Andrew M. Calderon; Roberts Mlotkowski Safran Cole & Calderon, P.C.

(57) ABSTRACT

A computing device generates profiles based on mobile device data. The computing device receives a plurality of mobile device records of a plurality of mobile devices in a region, that each include a timestamp, a location data, and an activity data, and assigns each of the plurality of mobile device records to one of a plurality of space-time boxes. The computing device performs analytics on the mobile device records assigned to the plurality of space-time boxes to yield a resulting plurality of profiles, which can include a mobility profile indicating the number of locations in the region that each mobile device occupies during a span, a hangout profile indicating the number of mobile devices that occupy each location in the region during a span, and a buddy profile indicating the mobile devices that occupy the same location in the region as a given mobile device.

20 Claims, 6 Drawing Sheets

(56) References Cited

U.S. PATENT DOCUMENTS

2012/0066138 A1   3/2012   Curtis et al.
2013/0073473 A1   3/2013   Heath

* cited by examiner

MOBILE DEVICE ANALYTICS

BACKGROUND

The present invention relates generally to performing analytics on mobile device data, and more particularly to analyzing mobile device data to determine mobile subscriber characteristics.

As the population of individuals using cell phones and other mobile devices has grown, location-based services have become increasingly important. Location-based services are a general class of computer program-level services used to include specific controls for location and time data as control features in computer programs. As such, location-based services are information services and have a number of uses in fields including social networking, city planning, disaster recovery, entertainment, convenience, and utility, and use data collected from mobile devices through a mobile network and which use information on the geographical position of mobile devices for various purposes. Many location-based services currently just provide the location of the mobile device user (i.e., the mobile subscriber). These are usually used to provide information to the subscriber based on the specific location of the subscriber (e.g., location-based services can provide a list of nearby restaurants, etc.). Location-based services can be valuable to marketing companies to send campaigns and to predict future flow of traffic, for example. The limitations of current location-based services include, for example, their inability to scale to large volumes of mobile device data.

SUMMARY

Embodiments of the present invention provide for a program product, system, and method for generating profiles based on mobile device data. A computing device receives a plurality of mobile device records of a plurality of mobile devices in a region, that each include a timestamp, a location data, and an activity data, and assigns each of the plurality of mobile device records to one of a plurality of space-time boxes. The computing device performs analytics on the mobile device records assigned to the plurality of space-time boxes to yield a resulting plurality of profiles, which can include a mobility profile indicating the number of locations in the region that each mobile device occupies during a span, a hangout profile indicating the number of mobile devices that occupy each location in the region during a span, and a buddy profile indicating the mobile devices that occupy the same location in the region as a given mobile device.

DETAILED DESCRIPTION

Figure 1:
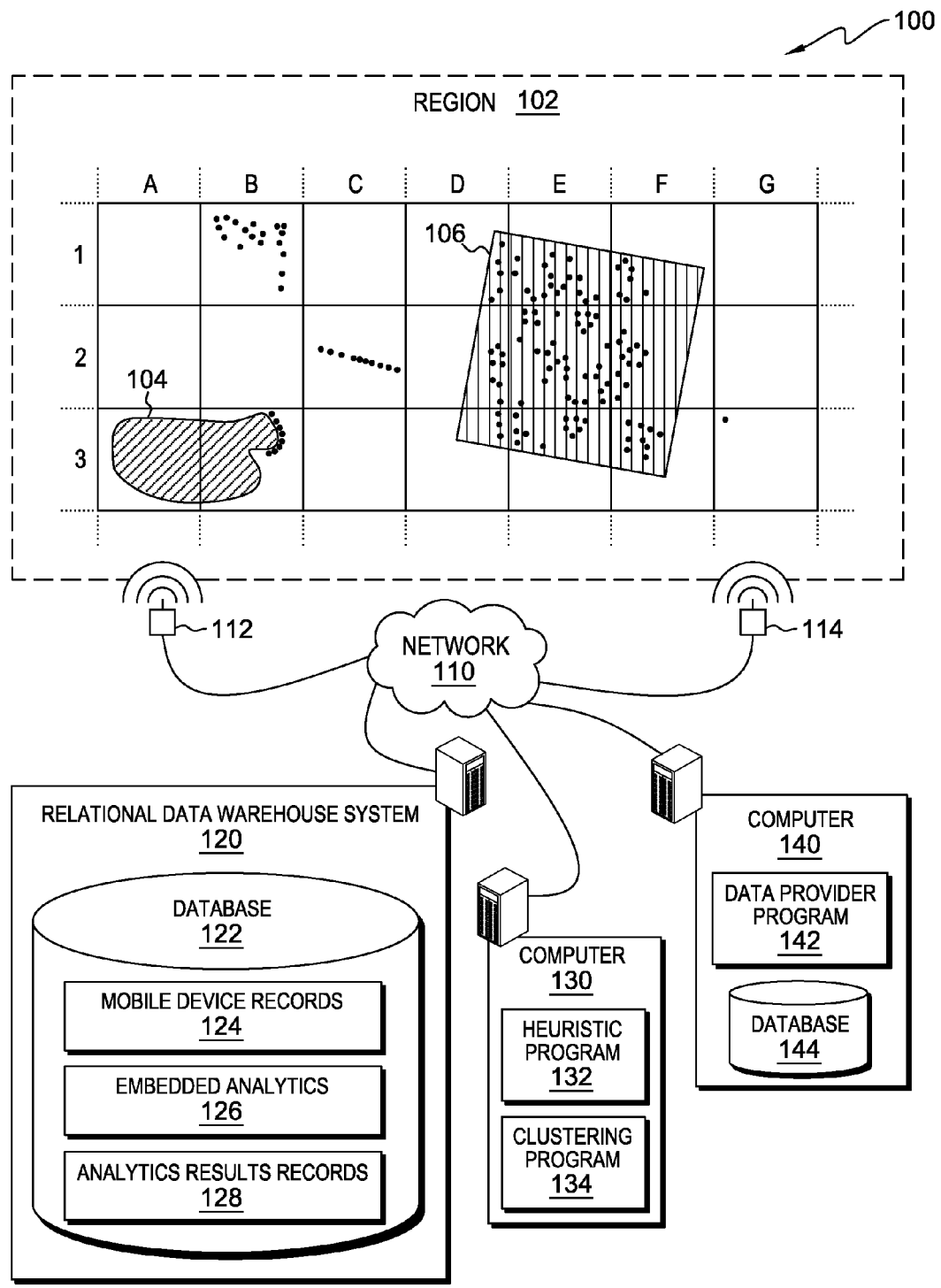
FIG. 1 is a functional block diagram of a communications environment in accordance with an embodiment of the present invention.

The techniques introduced herein address invoking appropriate analytic tools to perform delayed or even realtime analysis of location data provided by mobile communication providers as mobile device users (i.e., mobile subscribers) move about from place to place. Although the term subscriber will be used herein, it should be understood that the contractual or service relationship between an owner or user of a mobile device and the mobile communication provider providing cellular or other connectivity to the mobile device generally may have no bearing on the techniques introduced herein; as such, embodiments of the present invention can involve any combination of mobile device owners who subscribe to a communication provider, pre-paid or off-contract mobile device owners, or other mobile device users.

Hugely diverse subscriber bases and massive data volumes require specialized technology, introduced herein, for analysis. Making sense from all the mobile device data is possible using advanced analytics and powerful computing systems to perform "socio-mobile" analysis. According to the techniques introduced herein, the raw location data is abstracted to ascertain subscriber behavior and lifestyle profiles, enabling a number of use cases, such as personalized marketing, network analysis, traffic pattern understanding, and others. Interesting insights can be discovered about the subscribers using observed location data that are useful in many areas such as, but not limited to, location based marketing.

The techniques introduced herein involve the creation of individual subscriber-level mobility profiles (defined as, e.g., patterns of movement in space and time, etc.) using processes and technologies that can be used understand what types of people go where when, what types of locations are popular with whom, and who goes where, when, and with who. These patterns can be used to predict mobility for groups of individuals and for other purposes discussed herein.

Some things that can be accomplished using the techniques introduced herein include, for example, triggering realtime, personalized marketing; summarizing anonymous analysis of locations and subscriber profiles (e.g., for use within jurisdictions with data privacy laws, etc.); proactively targeting individuals or groups based on their past history; improving network utilization via understanding of usage by location, time of day, and subscriber profile; and co-marketing between data providers and retailers.

The techniques introduced herein can involve the generation or utilization of at least two individual profiles, which include lifestyle profiles (e.g., profiles defined by marketing analysts for specific use cases or marketing programs, etc.) and mobility profiles (e.g., profiles created using data mining algorithms that define how a subscriber moves around during the day, week, or other time period, etc.). Such individual profiles can uniquely define a subscriber with relation to how a data provider might want to market to, or otherwise engage, him or her.

According to the techniques introduced herein, lifestyle profiles can be created by, for example, marketing analysts or other data providers, as "rule of thumb" classifications of types of mobile subscribers. Generally, lifestyle profiles can be provided to the systems described herein (e.g., in the form of heuristic rules, etc.) to generate insight. For example, lifestyle profiles might seek to identify people who attend a football game in December, or people at children's soccer fields on summertime weekend mornings, or people who go to work in the mornings and stop at a coffee shop three or more days per week. The lifestyle profiles can be used to understand the mobility characteristics of each mobile subscriber. Several lifestyle profile nicknames used herein are "Homebody" (i.e., a mobile subscriber who does not visit very many unique locations), "Daily Grinder" (i.e., a mobile subscriber who travels back and forth to work, has quiet weekends, and makes stops along the way), "Norm Peterson" (i.e., a normative mobile subscriber who does not deviate from the behaviors of a large number of other mobile subscribers in a significant way (e.g., by more than half of one standard deviation, etc.)), "Delivering the Goods" (i.e., a mobile subscriber with no predictable patterns who visits many different locales during a day), "Globe Trotter" (i.e., a mobile subscriber who is either not in town or keeps his or her phone turned off), "Rover Wanderer" (i.e., a mobile subscriber who spends evenings at various locations with friends), and "Other" (i.e., a mobile subscriber who is difficult to categorize).

According to the techniques introduced herein, having generated a lifestyle profile, and having applied it (e.g., in the form of a heuristic rule, etc.) to the intermediate or final result of processing mobile device data to identify mobile subscribers belonging to the type or class of the lifestyle profile, the identified mobile subscribers can be targeted with advertisements or other communications from a data provider in order to influence their behavior or for other purposes. For example, if a Daily Grinder who goes to coffee shops is identified, he or she might be a target to switch away from a regular coffee shop in favor of a new coffee shop. Such targeting can involve the use of geo-fencing in order to deliver advertising to the Daily Grinder in real-time when he or she is near the new coffee shop, or can involve the use of predictive analytics to predictively target the Daily Grinder as or even before he or she approaches the area of the new coffee shop, because the analysis of the mobile device data (e.g., a mobility profile, a hangout profile, or a buddy profile, etc.) predicts that he or she will approach in the future.

The techniques introduced herein can generate and utilize a mobility measure, stemming from a series of calculations to derive values of mobility based on the number of unique locations visited within a particular time frame. Algorithms associated with the derivation of these values, discussed below, are based on multiple passes through the mobile device data to aggregate the values and then normalize the values across the data to enable relative comparisons. Locations can be defined as cell towers, coordinates from a GPS or in-vehicle tracking device, latitude and longitude, or retail locations where a payment card was used, for example. Each individual can have a score calculated by analyzing all the individual's mobility records within a space-time box, as discussed below. Each unique location in a time frame (e.g., 11:30 am-1:30 pm on Wednesday, etc.) is counted and the total number of unique locations visited is stored. Then, across all individuals, all the unique location counts are normalized to zero. By default, everyone has at least one location for every time frame, because everyone is somewhere all the time. However, according to the techniques introduced herein, when no data is available for one or more mobile subscribers, such that their locations are not known, "the absence of data" for a space-time box can be compensated for either by interpolation if other data is available or, in situations where there is a significant amount of missing data, by representing the resulting mobility cluster and profile as undefined due to lack of data. Mobility profiles can be grouped using heuristics or data mining algorithms to produce mobility clusters, as discussed below, which can take the form of "Daily Commuter," "Weekend Warrior," and other categories.

The techniques introduced herein can generate and utilize hangout profiles, by determining "hangouts," or popular locations, by mobility cluster or mobility profile. By passing through the mobile device data and identifying which individual spends how much time in a location, through a presence-based indicator for the space-time box, each location's popularity with each mobile subscriber can be determined. Through determinations of mobility such as diurnal, nocturnal, and weekday or weekend activity, locations such as "home," "work," "friends," and "relatives" can be determined. Further, by linking similar mobility profiles, "hot spots" can be spotted, (e.g., a given location is popular with people who are very active on Friday and Saturday nights downtown, etc.) as discussed below. A hangout profile can be similar to the mobility profile, but for locations. For each location in a given time frame, the number of unique visitors is counted. These counters are summed and ranked giving a list of people most likely to be in a location at a given time. This data can be then be clustered by mobility profile using data mining algorithms to determine the types or profiles of people likely to be in a location at a given time (e.g., office workers like to go to a particular restaurant at lunchtime, etc.). Hangout profiles can further identify where are the most popular places at a given time, what are the most common mobility and lifestyles profiles at these places, whether these are different from the overall population, and what locations do people come from before or go to after being at a given hangout location.

The techniques introduced herein can generate and utilize buddy models, by identifying who is around who else and when within a set of locations and time frames or space-time boxes. The buddy model can actually inspect all locations and time frames visited by all other mobile subscribers in the data set to identify all intersections in the space-time boxes. The output can include a ranked list for every space-time box of the number of time any other mobile subscriber was in the space-time box. For every space-time box, the other individuals or devices that are in the same space-time box can be counted, and the counters can be summed and ranked. The result is a list of buddies, or subscribers who are around the given subscriber most often. This data can be used to predict where the given subscriber will be based on the presence of his or her buddies in the same location. This technique can be computationally intense during calculation insofar as it involves comparing all data points to all other data points.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a functional block diagram of communications environment 100 in accordance with an embodiment of the present invention is shown. Communications environment 100 includes region 102, network 110, cellular towers 112 and 114, relational data warehouse system 120, computer 130, and computer 140. As discussed in detail below, mobile device data of a plurality of mobile subscribers in region 102 of communications environment 100 can be stored and analyzed in relational data warehouse system 120 for various purposes, including the application of heuristic rules and clustering algorithms, the transmission of communications to mobile subscribers, and other "sociomobile" analysis in accordance with embodiments of the present invention.

Region 102 can be a geographic region, such as a portion of the earth's surface. Region 102 includes a plurality of mobile subscribers, each depicted as a dot and each having a mobile device wirelessly connected to one or both of cellular towers 112 and 114. Region 102 is partitioned into grid squares having row coordinates (e.g., row 1, row 2, etc.) and having column coordinates (e.g., column A, column B, etc.). Grid squares are referred to herein by their row and column coordinates; for example, the grid square depicted nearest the top-left corner of region 102 is referred to as grid square 1A. In various embodiment, partitions can be represented in different ways (e.g., row-column coordinates, latitude-longitude boundary lines, geohashes, etc.). Grid square 1A is depicted as empty, while adjacent grid square 1B is depicted as including a plurality of dots each representing the location of a mobile subscriber having a mobile device.

It should be understood that the partitioning of region 102 into grid squares can be a logical partitioning that exists only within data structures stored in relational data warehouse system 120, and that has no actual physical existence within region 102. Further, although region 102 is not depicted as being entirely partitioned (i.e., there are portions of region 102 not included in a grid square), it is the case that in various embodiments a given region can be partially or entirely partitioned in any way. Further still, although region 102 is depicted as being partitioned in non-overlapping grid squares, in various embodiments partitions may be non-overlapping or overlapping, and may be of any arbitrary shape (e.g., rectangles, hexagons, "blobs," etc.). Further still, in various embodiments the spatial resolution of the partitioning of region 102 can vary; for example, each grid square can have an area of one square kilometer, one square meter, or any other area, and for another example the area of each grid square can be different, although the depicted grid squares in region 102 all have the same area.

It should also be understood that region 102 is depicted at a particular point in time. As time passes, the positions of the mobile subscribers will likely change, as each mobile subscriber performs various activities on a moment-by-moment basis, daily, or on any timescale. Accordingly, embodiments of the present invention contemplate "space-time boxes" having one or more spatial dimensions and a temporal dimension. Various embodiments of the present invention can utilize space-time boxes having two spatial dimensions and one temporal dimension (i.e., actual space-time boxes), can utilize space-time boxes having three spatial dimensions and one temporal dimension (i.e., volumetric four-dimensional space-time boxes), or can utilize space-time boxes with other dimensional combinations. An unmoving mobile subscriber can occupy a sequence of space-time boxes at a given spatial location and at consecutive times, while a moving mobile subscriber can occupy a sequence of space-time boxes at changing spatial locations at consecutive times. In various embodiments the temporal resolution of the partitioning of region 102 can vary, analogous to the variation in the spatial resolution; for example, each space-time box can have a temporal "depth" of one hour, one minute, or any other amount of time, and for another example the temporal resolution of different space-time boxes can vary or can be the same.

In addition to mobile subscribers, geographical and logical features are also depicted in region 102. For example, lake 104, a geographical feature of the earth's surface, occupies a portion of two grid squares, while downtown core 106, a logical feature, occupies a portion of eight grid squares surrounding the ninth entirely-occupied grid square 2E. Geographic features such as lake 104 exist in region 102 independently (e.g., can be natural or man-made features having a form determinable by direct observation, etc.), while logical features such as downtown core 106 may or may not exist in region 102 independently (e.g., may or may not be determinable by direct observation, and may exist only within data structures stored in relational data warehouse system 120, etc.). The analysis of mobile device data of the plurality of mobile subscribers in region 102 can suggest or reveal the existence of geographic or logical features.

Network 110 can be, for example, a local area network (LAN), a wide area network (WAN) such as the Internet, or a combination of the two, and can include wired or wireless connections. In general, network 110 can be any combination of connections and protocols that will support communications via various channels between the plurality of mobile devices in region 102, via cellular towers 112 and 114, and relational data warehouse system 120, computer 130, and computer 140, in accordance with an embodiment of the invention. In various embodiments of the present invention, cellular towers 112 and 114 may be operated by a common entity or by different entities (e.g., by a variety of mobile telecommunications companies, etc.). Further, in various embodiments cellular towers 112 and 114 can be augmented or replaced by any communication technology capable of communicatively coupling the plurality of mobile devices in region 102 with relational data warehouse system 120, computer 130, and computer 140.

In various embodiments, the plurality of mobile devices in region 102, relational data warehouse system 120, computer 130, and computer 140 can include laptops, tablets, netbook personal computers (PCs), desktop computers, personal digital assistants (PDAs), smart phones, automobiles, smart watches, RFID trackers, or other devices. Further, relational data warehouse system 120, computer 130, and computer 140 can include computing systems utilizing clustered computers and components to act as single pools of seamless resources when accessed through network 110, or can represent one or more cloud computing datacenters. In general, each of the plurality of mobile devices in region 102, as well as relational data warehouse system 120, computer 130, and computer 140 can be or can include any programmable electronic device as described in further detail with respect to FIG. 6.

Relational data warehouse system 120 can be a purpose-built data warehouse appliance for very high-volume data analysis by embedded analytical functions including statistical and data mining algorithms. In particular, relational data warehouse system 120 can include database 122, itself including mobile device records 124, embedded analytics 126, and analytics results records 128. Mobile device records 124 is a collection of records including mobile device data received by relational data warehouse system 120 from the plurality of mobile devices in region 102. The collection of records includes time-stamped location and activity data for each mobile device. Location data can include the location of each mobile device in terms of, for example, the device's coordinates from a GPS or in-vehicle tracking component, or its latitude and longitude, or any other coordinate system and source. Activity data can include any activity of each mobile device in terms of, for example, the device's sent and received calls, sent and received data, text messages, cell tower affinity, application usage, or any other activity stemming from any operation of the mobile device. Further, activity data can include a mere presence indicator (e.g., a "heartbeat," "beacon," or "keep-alive" indicator, etc.), such that a record including location data and a mere presence indicator serves to identify the location of the corresponding mobile device even when it is otherwise idle or inactive. As discussed in detail below, embedded analytics 126 can operate on mobile device records 124 for various purposes, to produce and store intermediate results and final results in analytics results records 128.

Computer 130 includes heuristic program 132 and clustering program 134. Computer 130 can be a computer configured to apply heuristic rules and clustering algorithms to several of the intermediate and final results generated within relational data warehouse system 120, for the purposes of classifying mobile subscribers, gaining insight into the characteristics of region 102, assisting data provider program 142 of computer 140 in the transmission of communications to mobile subscribers, and other purposes.

Computer 140 includes data provider program 142 and database 144. Computer 140 can be a computer configured for the transmission of communications to mobile subscribers, and can be, for example, a computer operated by a marketing entity or other data provider entity. As discussed below, data provider program 142 can transmit communications, stored in database 144, to mobile subscribers in region 102 at least partially on the basis of insights generated by one or both of relational data warehouse system 120 and computer 130.

Figure 2:
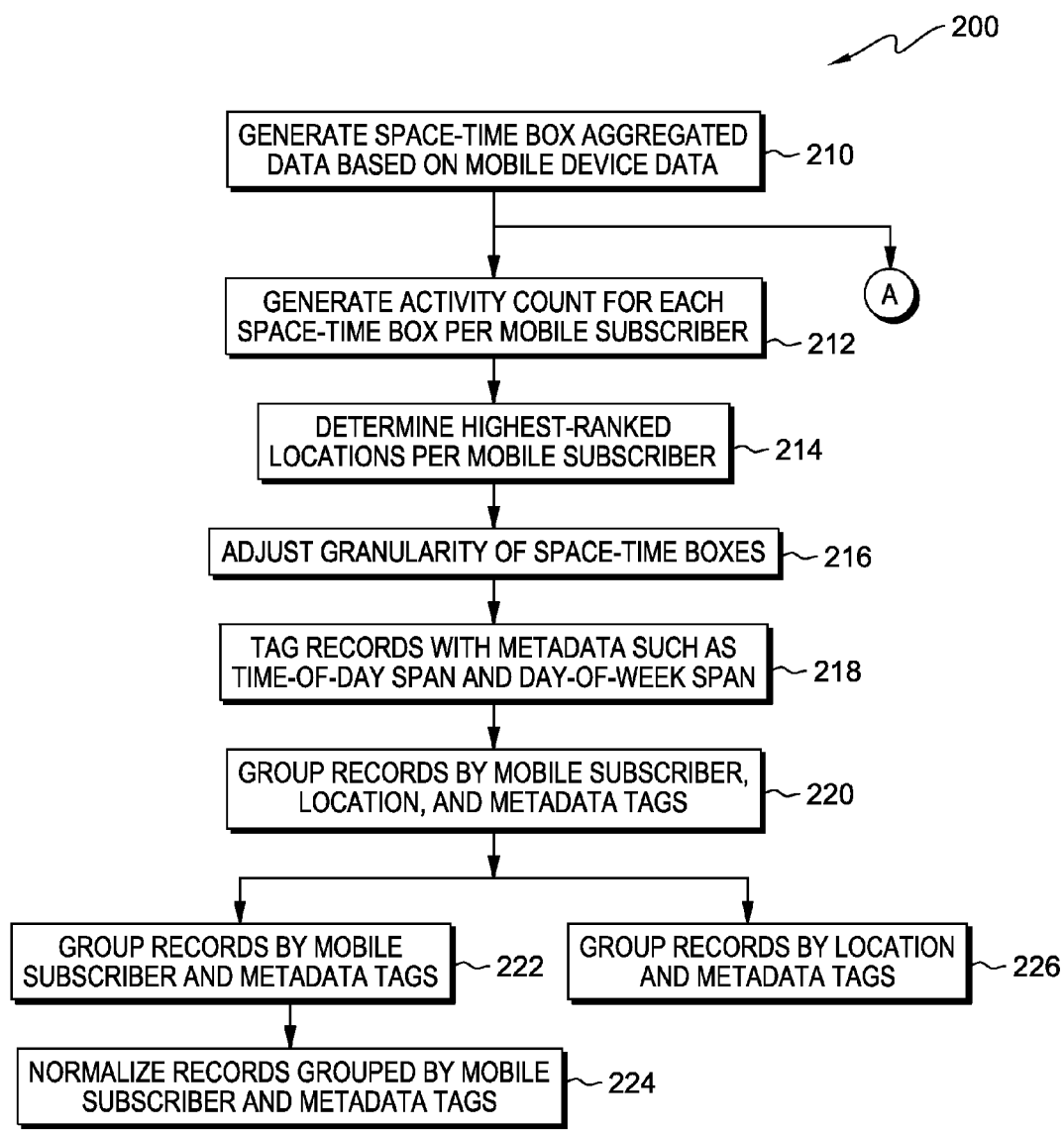
FIG. 2 shows a flowchart depicting steps followed during the generation of mobility profiles and hangout profiles based on mobile device data stored in the relational data warehouse system of FIG. 1 in accordance with an embodiment of the present invention.

Referring now to FIG. 2, flowchart 200 depicting steps followed during the generation of mobility profiles and hangout profiles based on mobile device data stored in relational data warehouse system 120 in accordance with an embodiment of the present invention is shown. Generally, a mobility measure is the result of a series of algorithms and calculations that is an indicator of mobility and activity, and a mobility profile is the collection of mobility measures over a particular time-of-day span (e.g., a day can be partitioned into several general time-of-day spans, such as "breakfast," "morning," "lunch," "afternoon," "dinner," and "evening," etc.) and a particular day-of-week span (e.g., a week can be partitioned into several general day-of-week spans, such as "weekday" and "weekend," etc.) for an individual mobile subscriber. As such, in one embodiment there can be twelve measurements for every individual (i.e., the number of time-of-day spans multiplied by the number of day-of-week spans) and together those measures make up the individual mobility profile. Further generally, the mobility profile can be analyzed to create a grouping to indicate the general lifestyle type of the individual mobile subscriber, such that each and every mobility profile can be unique to an individual mobile subscriber.

In step 210, embedded analytics 126 generates space-time box aggregated data from mobile device records 124 and stores the result (i.e., the intermediate result) in analytics results records 128. Embedded analytics 126 can generate space-time box aggregated data by determining the spatial and temporal resolution of each space-time box, and then by assigning each record, which includes time-stamped location and activity data for a mobile device, to a space-time box. In one embodiment, step 210 includes a preprocessing step that transforms geographic location data for each mobile device into logical location data for each mobile device (e.g., transforms geographic location data into a geohash, etc.) In an embodiment in which each space-time box has the spatial resolution of the grid squares shown in region 102 of FIG. 1 (e.g., grid square 2E has the spatial resolution of the depicted portion of downtown core 106, etc.), and has a temporal resolution of five minutes, then embedded analytics 126 can assign each record occurring anywhere within each grid square and occurring anytime in a given five-minute interval to the corresponding space-time box. For another example, given every grid square depicted in region 102, and given one hour's worth of mobile device data, a temporal resolution of five minutes yields data aggregated into 252 space-time boxes (i.e., the product of the depicted twenty-one grid squares and the twelve five-minute intervals in one hour is 252 space-time boxes). Accordingly, step 200 can be regarded as a "boxing" of the "raw" mobile device data of mobile device records 124 into space-time boxes, stored as an intermediate result in analytics results records 128.

Figure 3:
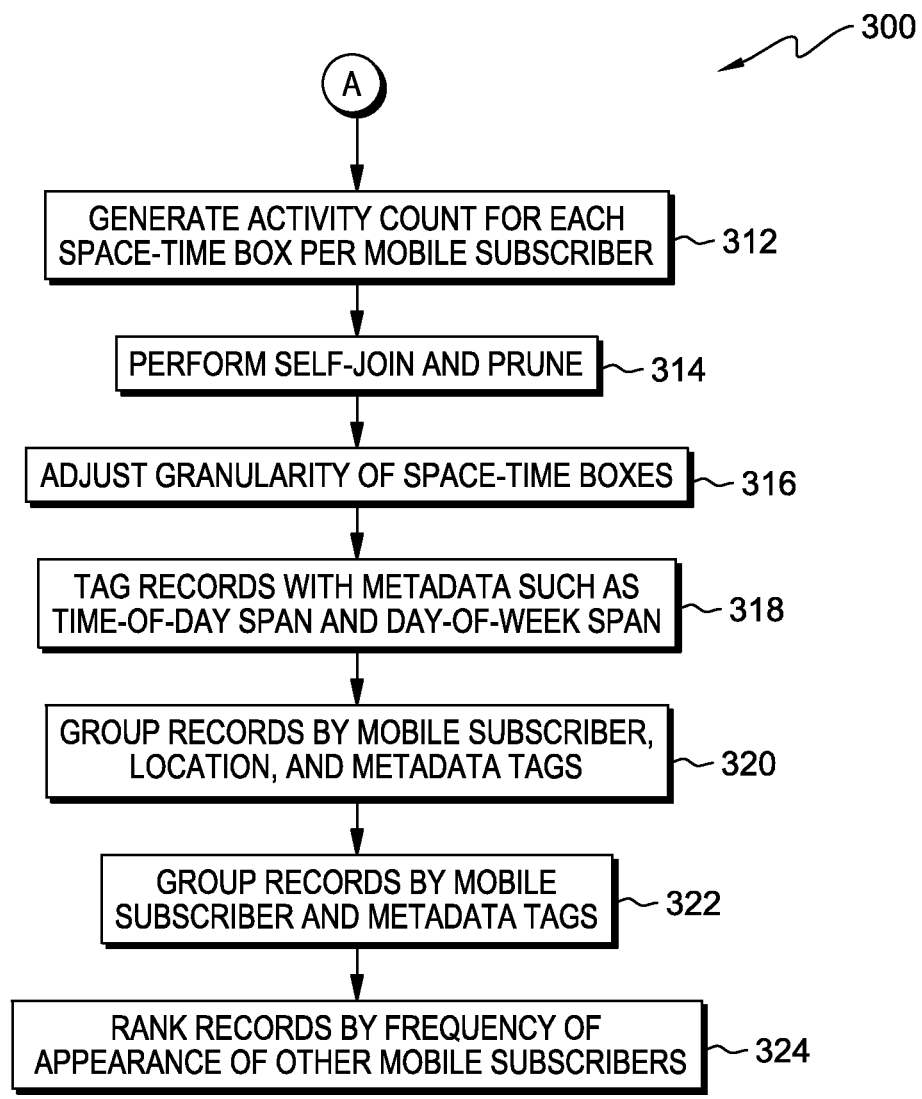
FIG. 3 shows a flowchart depicting steps followed during the generation of buddy profiles based on mobile device data stored in the relational data warehouse system of FIG. 1 in accordance with an embodiment of the present invention.

At the conclusion of step 210, flowchart 200 forks in two paths, the first proceeding through step 212 and beyond, and the second proceeding through symbol A, which is continued in FIG. 3. In various embodiments, one or both of the forked paths can be followed as embedded analytics 126 further processes the mobile device data. The first path will be discussed below in the context of FIG. 2, and the second path will be discussed further below in the context of FIG. 3.

In step 212, embedded analytics 126 generates activity counts for each space-time box per mobile subscriber in the intermediate result of step 210, and stores the result as a new intermediate result in analytics results records 128. Embedded analytics 126 can generate an activity count for a given space-time box per mobile subscriber by summing the total number of activities performed by a mobile subscriber in the space-time box. For example, if the sole mobile subscriber depicted in grid square 3G sends and receives three total text messages in the first five minutes of a given hour's worth of mobile device data, and makes one phone call and sends one text message in the second five minutes, then embedded analytics 126 can generate and store the activity counts three and two, respectively, for the two five-minute intervals of the corresponding space-time boxes of gird square 3G.

In step 214, embedded analytics 126 determines the highest-ranked locations per mobile subscriber per time interval in the intermediate result of step 212, and stores the result as a new intermediate result in analytics results records 128. Embedded analytics 126 can determine the highest-ranked locations per mobile subscriber per time interval by first ranking the space-time boxes in which a given mobile subscriber has an activity count in order of descending activity counts, and then by identifying a threshold number of those ranked space-time boxes at the top of the ranking. For example, if the sole mobile subscriber depicted in grid square 3G moves into adjacent grid squares 3F, 3E, and 3D as time passes, all the while performing various mobile activities, and if the threshold number is three, then embedded analytics 126 will determine the top-three ranked grid-squares of the four total grid squares in step 214. In particular, if the sole mobile subscriber depicted in grid square 3G moves as described, and increases his or her mobile activity upon entering downtown core 106, then this can be reflected as embedded analytics 126 determines the highest-ranked locations for the sole mobile subscriber are grid squares 3F, 3E, and 3D, under the circumstances described.

In step 216, embedded analytics 126 adjusts the granularity of the space-time boxes in the intermediate result of step 214, and stores the result as a new intermediate result in analytics results records 128. Embedded analytics 126 can adjust the granularity of the space-time boxes by increasing or decreasing the spatial or temporal resolution of each space-time box. One purpose of adjusting the granularity is to reduce "flutter," i.e., to reduce the number of transitions recorded as a given mobile subscriber moves back and forth across the spatial boundary of two space-time boxes (e.g., by moving back and forth across the boundary between two grid squares, etc.). Accordingly, flutter can be reduced by decreasing the spatial resolution of all space-time boxes. Embedded analytics 126 can decrease the spatial resolution by, for example, merging a group of adjacent grid squares to produce a new, larger grid square (e.g., nine one square meter grid squares arranged in a three-by-three square can be merged into a single nine square meter grid square, etc.). Alternatively, embedded analytics 126 can decrease the spatial resolution by, for example, refactoring the mobile device data into a new group of grid squares that are generally larger but that are not the result of a relatively straightforward merger. Generally, step 216 can be regarded as a "reboxing" of the prior intermediate results in a manner determined to change the granularity of the space-time boxes.

In step 218, embedded analytics 126 tags the records of the space-time boxes with metadata such as time-of-day span and day-of-week span in the intermediate result of step 216, and stores the result as a new intermediate result in analytics results records 128. Embedded analytics 126 can tag the records with metadata by assigning each record, which includes time-stamped location and activity data for a mobile device, a tag based on its timestamp, or based on the temporal dimension of its associated space-time box. As stated above, time-of-day spans can include the spans "breakfast," "morning," "lunch," "afternoon," "dinner," and "evening," while day-of-week spans can include the spans "weekday" and "weekend," for example. Accordingly, embedded analytics 126 can tag a given record with a "breakfast" time-of-day span if its timestamp falls between 8 AM and 10 AM, for example, and can tag the same given record with a "weekday" day-of-week span if its timestamp falls on Monday. As such, it should be understood that each record can have one tag or multiple tags. At the conclusion of step 218, embedded analytics 126 has generated a new intermediate result for storage in analytics results records 128 that includes a variety of tags.

In step 220, embedded analytics 126 groups the records of the space-time boxes in the intermediate result of step 218 by mobile subscriber, location, and metadata tags, and stores the result as a new intermediate result in analytics results records 128. Embedded analytics 126 can group the records by, for example, executing a database instruction (e.g., an SQL statement, etc.) including a "group by" clause that operates on the mobile subscriber, location, time-of-day span, and day-of-week span of each record. The resulting new intermediate result effectively recites, for every mobile subscriber, the unique locations that each subscriber occupies during the various metadata tagged-spans.

At the conclusion of step 220, flowchart 200 forks in two paths, the first proceeding through steps 222 and 224, and the second proceeding through step 226. In various embodiments, one or both of the forked paths can be followed as embedded analytics 126 further processes the mobile device data. The paths will be discussed in turn below, starting with the first path.

In step 222, embedded analytics 126 groups the records of the space-time boxes in the intermediate result of step 220 by mobile subscriber and metadata tags, and stores the result as a new intermediate result in analytics results records 128. Embedded analytics 126 can group the records by, for example, executing a database instruction (e.g., an SQL statement, etc.) including a "group by" clause that operates on the mobile subscriber, time-of-day span, and day-of-week span of each record. Thus, notably, the grouping of step 222 can be regarded as a narrower grouping of the grouping of step 220, insofar as location has been removed as a grouping factor. The resulting new intermediate result effectively recites, for every mobile subscriber, the number of unique locations that each subscriber occupies during the various metadata tagged-spans. This recitation can be regarded as a mobility measure for each mobile subscriber, capturing the mobility of each mobile subscriber during the various metadata tagged-spans.

In step 224, embedded analytics 126 normalizes the records of the space-time boxes in the intermediate result of step 222 that have been grouped by mobile subscriber and metadata tags, and stores the result as a new intermediate result in analytics results records 128. Embedded analytics 126 can normalize the records by, for example, analyzing the records by a statistical process resulting in standardized values centered around zero. The normalized values allow for the comparison of records across different sources, for example. This normalized recitation, a final result following a number of intermediate results, can be regarded as a mobility profile for each mobile subscriber.

In step 226, embedded analytics 126 groups the records of the space-time boxes in the intermediate result of step 220 by location and metadata tags, and stores the result as a new intermediate result in analytics results records 128. Embedded analytics 126 can group the records by, for example, executing a database instruction (e.g., an SQL statement, etc.) including a "group by" clause that operates on the location, time-of-day span, and day-of-week span of each record. Thus, notably, the grouping of step 226 can be regarded as a narrower grouping of the grouping of step 220, insofar as mobile subscriber has been removed as a grouping factor. The resulting new intermediate result effectively recites, for every location, the number of mobile subscribers that occupy each location during the various metadata tagged-spans. This recitation, a final result following a number of intermediate results, can be regarded as a hangout profile for each location, capturing the popularity of each location during the various metadata tagged-spans.

Referring now to FIG. 3, flowchart 300 depicting steps followed during the generation of buddy profiles based on mobile device data stored in relational data warehouse system 120 in accordance with an embodiment of the present invention is shown. Generally, buddy models identify who is around who else and when within a set of space-time boxes. Buddy modeling involves the inspection of all locations and time frames visited by all other mobile subscribers in the data set to identify all intersections in the space-time boxes. The output can include a ranked list for every space-time box of the number of times any other mobile subscriber was in the space-time box. For every space-time box, the other individuals or devices that are in the same space-time box can be counted, and the counters can be summed and ranked. The result is a list of buddies, or subscribers who are around the given subscriber most often. This data can be used to predict where the given subscriber will be based on the presence of his or her buddies in the same location.

As discussed above in the context of FIG. 2, at the conclusion of step 210 flowchart 200 forks in two paths, the first proceeding through step 212 and beyond, and the second proceeding through symbol A, which is continued in FIG. 3. Discussion turns now to the continuation through symbol A of flowchart 300 at step 312.

In step 312, embedded analytics 126 generates activity counts for each space-time box per mobile subscriber in the intermediate result of step 210, and stores the result as a new intermediate result in analytics results records 128. Embedded analytics 126 can generate an activity count for a given space-time box per mobile subscriber in the manner discussed above in the context of step 212.

In step 314, embedded analytics 126 performs a self-join and prune on the intermediate result of step 212, and stores the result as a new intermediate result in analytics results records 128. Embedded analytics 126 can perform a self-join by determining, for each mobile subscriber, for each space-time box a given mobile subscriber is in, which other mobile subscribers were also in the space-time box. Embedded analytics 126 can perform a prune by removing, for each mobile subscriber, each instance of the same mobile subscriber from the result of the self-join. The result of the self-join and the prune can include a sparse matrix of every space-time box listing, by mobile subscriber, every other mobile subscriber present.

In step 316, embedded analytics 126 adjusts the granularity of the space-time boxes in the intermediate result of step 314, and stores the result as a new intermediate result in analytics results records 128. Embedded analytics 126 can adjust the granularity of the space-time boxes by increasing or decreasing the spatial or temporal resolution of each space-time box in the manner discussed above in the context of step 216.

In step 318, embedded analytics 126 tags the records of the space-time boxes with metadata such as time-of-day span and day-of-week span in the intermediate result of step 316, and stores the result as a new intermediate result in analytics results records 128. Embedded analytics 126 can tag the records with metadata by assigning each record, which includes time-stamped location and activity data for a mobile device, a tag based on its timestamp, or based on the temporal dimension of its associated space-time box. As stated above, time-of-day spans can include the spans "breakfast," "morning," "lunch," "afternoon," "dinner," and "evening," while day-of-week spans can include the spans "weekday" and "weekend," for example, as discussed above in the context of FIG. 2. At the conclusion of step 318, embedded analytics 126 has generated a new intermediate result for storage in analytics results records 128 that includes a variety of tags.

In step 320, embedded analytics 126 groups the records of the space-time boxes in the intermediate result of step 318 by mobile subscriber, location, and metadata tags, and stores the result as a new intermediate result in analytics results records 128. Embedded analytics 126 can group the records by, for example, executing a database instruction (e.g., an SQL statement, etc.) including a "group by" clause that operates on the mobile subscriber, location, time-of-day span, and day-of-week span of each record.

In step 322, embedded analytics 126 groups the records of the space-time boxes in the intermediate result of step 320 by mobile subscriber and metadata tags, and stores the result as a new intermediate result in analytics results records 128. Embedded analytics 126 can group the records by, for example, executing a database instruction (e.g., an SQL statement, etc.) including a "group by" clause that operates on the mobile subscriber, time-of-day span, and day-of-week span of each record. Thus, notably, the grouping of step 322 can be regarded as a narrower grouping of the grouping of step 320, insofar as location has been removed as a grouping factor.

In step 324, embedded analytics 126 ranks the records of the space-time boxes, per mobile subscriber, by the frequency of the appearance of other mobile subscribers in descending order. The result is an ordered list, per given mobile subscriber, of all other mobile subscribers that appear in the same space-time boxes as the given mobile subscriber, ranked in order of descending appearance frequency. This listing, a final result following a number of intermediate results, can be regarded as a buddy profile for each mobile subscriber, capturing the other mobile subscribers each mobile subscriber has been in spatial and temporal proximity with.

Figure 4A:
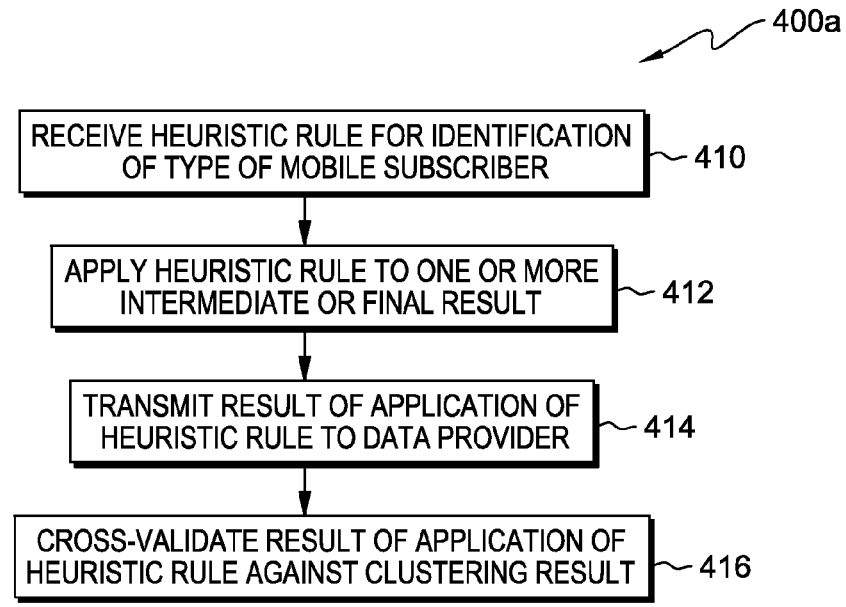
FIGS. 4A and 4B show flowcharts depicting steps followed during the applications of heuristic rules and clustering algorithms to several of the intermediate and final results generated during the performance of the flowcharts of FIGS. 2 and 3 in accordance with embodiments of the present invention.
Figure 4B:
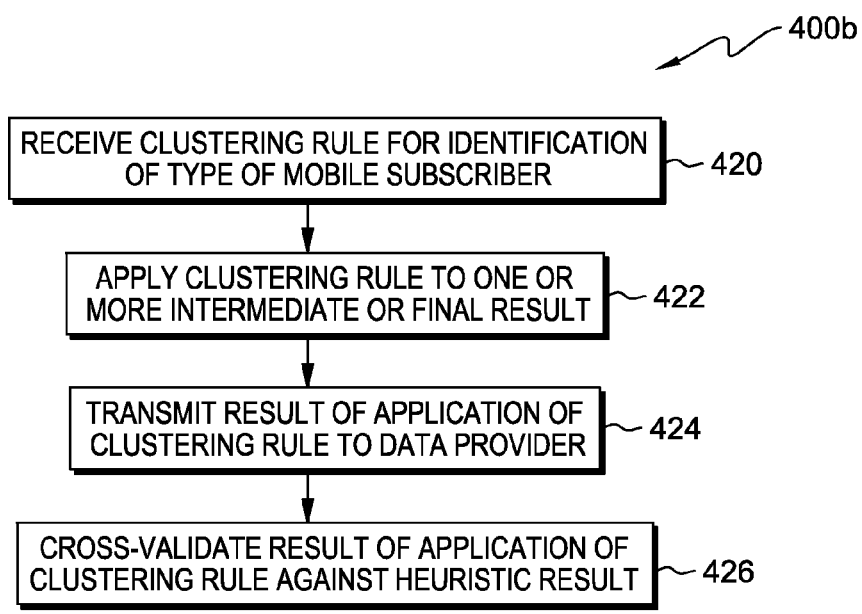

Referring now to FIGS. 4A and 4B, flowcharts 400a and 400b depicting steps followed during the applications of heuristic rules and clustering algorithms, respectively, to several of the intermediate and final results generated during the performance of flowcharts 200 and 300 in accordance with embodiments of the present invention are shown.

Turning now to FIG. 4A, flowchart 400a can be performed by heuristic program 132 of computer 130. Generally, heuristic program 132 applies heuristic rules to several of the intermediate and final results generated as discussed above, in order to classify mobile subscribers, gain insight into the characteristics of region 102, and assist data provider program 142 of computer 140 in the transmission of communications to mobile subscribers, for example. A heuristic rule can include a list of criteria combined with logical operators (e.g., AND, OR, etc.) that, if it evaluates to true, identifies a mobile subscriber as belonging to a particular lifestyle profile. For a specific example, one illustrative heuristic rule is "IF (('morning'>−0.5) AND ('breakfast'>−0.5) AND ('lunch'<1) AND ('afternoon'<1)) THEN type EQUALS 'Daily Grinder'." This illustrative heuristic rule identifies a mobile subscriber as belonging to the type "Daily Grinder" if the values in his or her mobility profile satisfy all four of the conjunctively-joined criteria. A variety of heuristic rules can be developed to identify mobile subscribers of different types.

In step 410, heuristic program 132 receives a heuristic rule for the identification of a type of mobile subscriber. For example, heuristic program 132 can receive heuristic rules for identifying one or more of the "Homebody," "Daily Grinder," "Norm Peterson," "Delivering the Goods," "Globe Trotter," "Rover Wanderer," and "Other" lifestyle profiles discussed above. These listed lifestyle profiles are merely illustrative, and many additional lifestyle profiles can be generated and reduced to heuristic rules to be received in step 410. Heuristic program 132 can receive the heuristic rule from, for example, data provider program 142 of computer 140.

In step 412, heuristic program 132 applies the received heuristic rule or rules to one or more intermediate or final results. In one embodiment, heuristic program 132 injects the heuristic rule or rules into relational data warehouse system 120 for application there, while in another embodiment heuristic program 132 receives the one or more intermediate or final results at computer 130 and applies the received heuristic rule or rules at computer 130. Generally, the latter may be feasible, insofar as the size of the one or more intermediate or final results can be considerably reduced as compared to the original size of the mobile device data received at relational data warehouse system 120 from the mobile subscribers in region 102. The one or more intermediate or final results that the heuristic rule or rules are applied to can be, for example, the mobility profiles of the mobile subscribers.

In step 414, heuristic program 132 transmits the result of the application of the heuristic rule or rules to, for example, data provider program 142 of computer 140. Accordingly, data provider program 142 can utilize the result to direct communications, stored in database 144, to the mobile subscribers in region 102 identified in the results, as discussed in detail below.

In step 416, heuristic program 132 cross-validates the result of the application of the heuristic rule or rules against the clustering result generated during flowchart 400b. Generally, cross-validation can demonstrate the accuracy or utility of the heuristic rules, as discussed more below in the context of flowchart 400b.

Turning now to FIG. 4B, flowchart 400b can be performed by clustering program 134 of computer 130. Generally, clustering program 134 can perform a two-step cluster method, which is a scalable cluster analysis algorithm designed to handle very large data sets, and which can handle both continuous and categorical variables or attributes. The two-step cluster method requires only one data pass, and has two steps, which involve pre-clustering records into many small sub-clusters, and clustering the sub-clusters resulting from the pre-cluster step into the desired number of clusters (e.g., the number can be automatically selected, etc.).

In step 420, clustering program 134 receives a clustering rule for the identification of a type of mobile subscriber. For example, clustering program 134 can receive clustering rules for identifying a clustering profile. Clustering profiles are analogous to lifestyle profiles, insofar as the one or more intermediate or final results in analytics results records 128 of relational data warehouse system 120 will yield clusters according to the clustering profiles upon the application of a clustering algorithm. Clustering program 134 can receive the clustering rule from, for example, data provider program 142 of computer 140.

In step 422, heuristic program 132 applies the received clustering rule or rules to one or more intermediate or final results by performing a clustering algorithm. In one embodiment, clustering program 134 injects the clustering rule or rules into relational data warehouse system 120 for application there, while in another embodiment clustering program 134 receives the one or more intermediate or final results at computer 130 and applies the received clustering rule or rules at computer 130. Generally, the latter may be feasible, insofar as the size of the one or more intermediate or final results can be considerably reduced as compared to the original size of the mobile device data received at relational data warehouse system 120 from the mobile subscribers in region 102. The one or more intermediate or final results that the clustering rule or rules are applied to can be, for example, the mobility profiles of the mobile subscribers.

In step 424, clustering program 134 transmits the result of the application of the clustering rule or rules to, for example, data provider program 142 of computer 140. Accordingly, data provider program 142 can utilize the result to direct communications, stored in database 144, to the mobile subscribers in region 102 identified in the results, as discussed in detail below.

In step 426, clustering program 134 cross-validates the result of the application of the clustering rule or rules against the heuristic result generated during flowchart 400a. Generally, cross-validation can demonstrate the accuracy or utility of the clustering rules and the heuristic rules. This is the case at least because a similarity between the heuristic and clustering results demonstrates consistency and correctness, while a divergence between the two can demonstrates that one or the other may require a correction.

Figure 5:
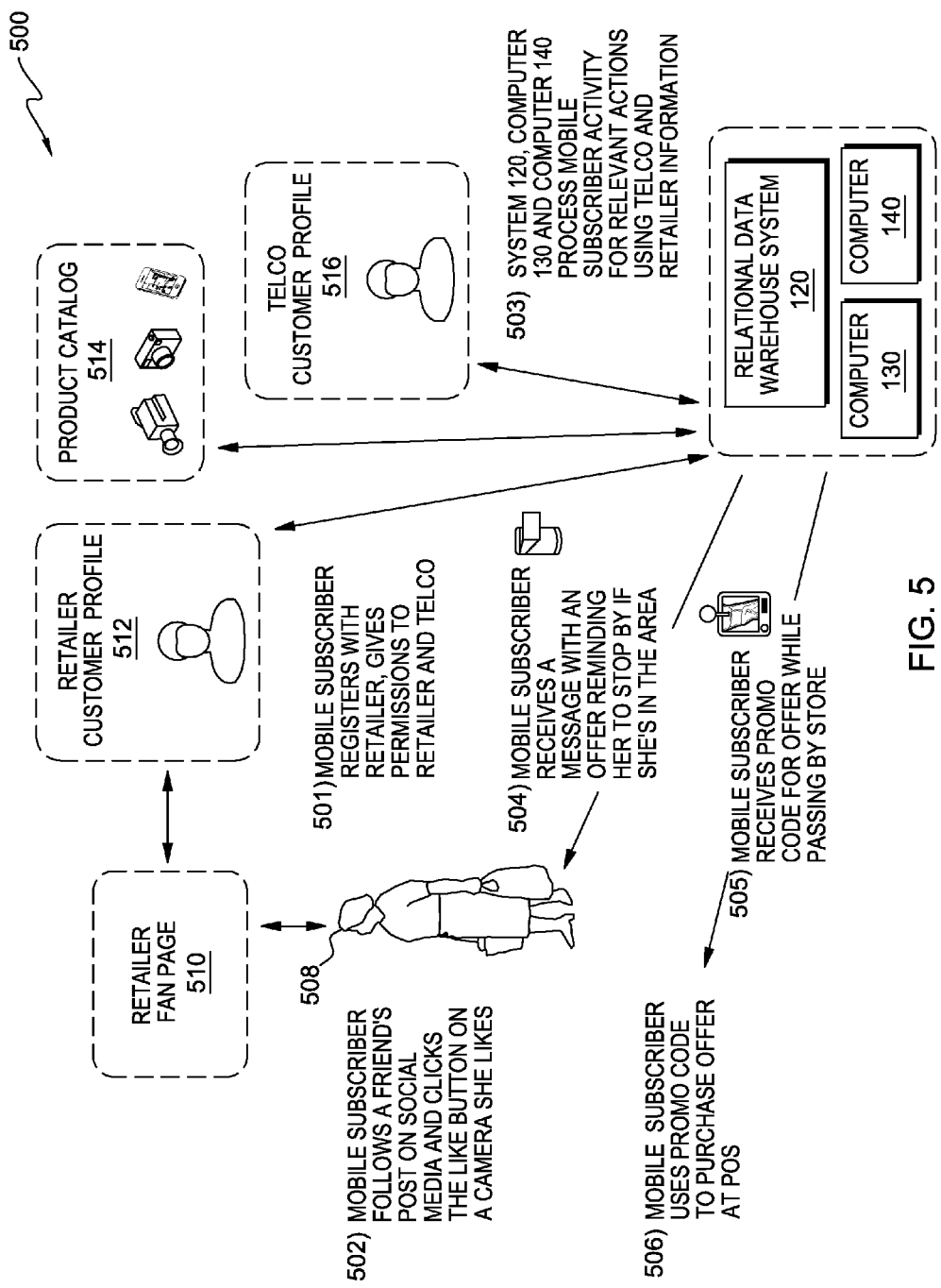
FIG. 5 shows a sequence of interactions for the collection, analysis, and use of mobile device data in accordance with embodiments of the present invention.

Referring now to FIG. 5, sequence 500 of interactions for the collection, analysis, and use of mobile device data in accordance with embodiments of the present invention is shown. Depicted in sequence 500 are mobile subscriber 508, retailer fan page 510, retailer customer profile 512, product catalog 514, and telecommunication company (i.e., "telco") customer profile 516. Retailer fan page 510 can be a fan page for a retailer hosted on a social media website. Retailer customer profile 512, product catalog 514, and telco customer profile 516 can be data stored in, e.g., database 144 of computer 140.

In interaction 501, mobile subscriber 508 registers with a retailer, and gives permissions to the retailer and the telco providing connectivity to her mobile device, indicating her permission to participate in the following interactions of sequence 500. In interaction 502, mobile subscriber 508 follows a friend's post on a social media website and clicks a "like" button on a product (e.g., a camera, etc.) that she likes. Interaction 502 is registered to the retailer via retailer fan page 510. In interaction 503, relational data warehouse system 120, computer 130, and computer 140 process the activity of mobile subscriber 508 for relevant actions using telco and retailer information, according to the techniques described above (e.g., a mobility profile and buddy profile is generated for mobile subscriber 508, and mobile subscriber 508 is identified in a hangout profile, etc.). In interaction 504, responsive to the processing performed in interaction 503, mobile subscriber 508 receives a message (e.g., sent from data provider program 142, etc.) with an offer reminding her to stop by a store of the retailer if she is in the area. In interaction 505, responsive to the processing performed in interaction 503, and responsive to geofencing detection of mobile subscriber 508 near a store of the retailer, mobile subscriber 508 receives a promotional code (e.g., sent from data provider program 142, etc.) for the offer while she is passing by the store. In interaction 506, mobile subscriber 508 uses the promotional code to purchase the offer at a point of sale in the store of the retailer.

Figure 6:
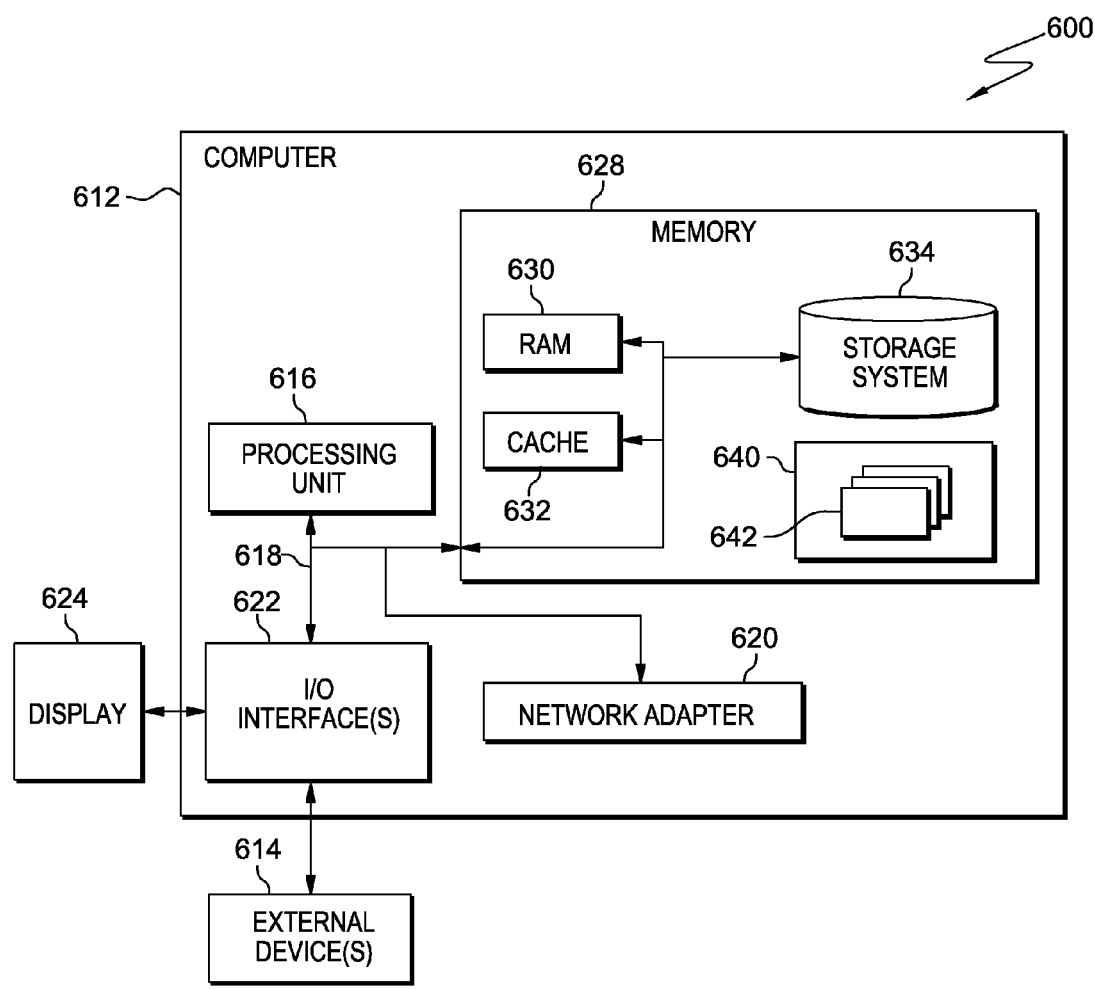
FIG. 6 is a functional block diagram of a computer system in accordance with an embodiment of the present invention.

Referring now to FIG. 6, a functional block diagram of a computer system in accordance with an embodiment of the present invention is shown. Computer system 600 is only one example of a suitable computer system and is not intended to suggest any limitation as to the scope of use or functionality of embodiments of the invention described herein. Regardless, computer system 600 is capable of being implemented and/or performing any of the functionality set forth hereinabove.

In computer system 600 there is computer 612, which is operational with numerous other general purpose or special purpose computing system environments or configurations. Examples of well-known computing systems, environments, and/or configurations that may be suitable for use with computer 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each of the mobile devices in region 102, relational data warehouse system 120, computer 130, and computer 140 can include or can be implemented as an instance of computer 612.

Computer 612 may be described in the general context of computer system executable instructions, such as program modules, being executed by a computer system. Generally, program modules may include routines, programs, objects, components, logic, data structures, and so on that perform particular tasks or implement particular abstract data types. Computer 612 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 6, computer 612 in computer system 600 is shown in the form of a general-purpose computing device. The components of computer 612 may include, but are not limited to, one or more processors or processing units 616, memory 628, and bus 618 that couples various system components including memory 628 to processing unit 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 612 typically includes a variety of computer system readable media. Such media may be any available media that is accessible by computer 612, and includes both volatile and non-volatile media, and removable and non-removable media.

Memory 628 can include computer system readable media in the form of volatile memory, such as random access memory (RAM) 630 and/or cache 632. Computer 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, memory 628 may include at least one program product having a set (e.g., at least one) of program modules that are configured to carry out the functions of embodiments of the invention.

Program 640, having one or more program modules 642, may be stored in memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein. Each one of embedded analytics 126, heuristic program 132, clustering program 134, and data provider program 142 can be implemented as or can be an instance of program 640.

Computer 612 may also communicate with one or more external devices 614 such as a keyboard, a pointing device, etc., as well as display 624; one or more devices that enable a user to interact with computer 612; and/or any devices (e.g., network card, modem, etc.) that enable computer 612 to communicate with one or more other computing devices. Such communication can occur via Input/Output (I/O) interfaces 622. Still yet, computer 612 can communicate with one or more networks such as a local area network (LAN), a general wide area network (WAN), and/or a public network (e.g., the Internet) via network adapter 620. As depicted, network adapter 620 communicates with the other components of computer 612 via bus 618. It should be understood that although not shown, other hardware and/or software components could be used in conjunction with computer 612. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for generating profiles based on mobile device data, the method comprising:
   receiving, at a computing device, a plurality of mobile device records of a plurality of mobile devices in a region, wherein each of the plurality of mobile device records includes a timestamp, includes a location data, and includes an activity data;
   assigning, by the computing device, each of the plurality of mobile device records to one of a plurality of space-time boxes each having at least two spatial dimensions and a temporal dimension;
   performing, by the computing device, one or more analytics on the plurality of mobile device records assigned to the plurality of space-time boxes to yield a resulting plurality of profiles, wherein the plurality of profiles are created based on the plurality of space-time boxes to which the plurality of mobile device records are assigned.

2. The method of claim 1, further comprising:
   increasing the size of at least one dimension of at least one of the plurality of space-time boxes; and
   generating activity counts for each space-time box per mobile device record of the plurality of mobile device records, wherein the plurality of profiles are further based on the activity counts.

3. The method of claim 1, further comprising:
   normalizing at least one of the resulting plurality of profiles; and
   ranking, the plurality of mobile device records by frequencies of appearance of other mobile devices.

4. The method of claim 1, further comprising:
   tagging each of the plurality of mobile device records with a metadata tag that includes a span; and
   grouping the plurality of mobile device records by mobile device location and the metadata tag.

5. The method of claim 1, wherein at least one of the resulting plurality of profiles includes a mobility profile indicating the number of locations in the region that each mobile device occupies during a span.

6. The method of claim 1, wherein at least one of the resulting plurality of profiles includes a hangout profile indicating the number of mobile devices that occupy each location in the region during a span.

7. The method of claim 1, wherein at least one of the resulting plurality of profiles includes a buddy profile indicating the mobile devices that occupy the same location in the region as a given mobile device.

8. The method of claim 1, further comprising applying a heuristic rule to at least one of the resulting plurality of profiles to identify a mobile device as belonging to a lifestyle profile.

9. The method of claim 1, further comprising applying a clustering rule to at least one of the resulting plurality of profiles to identify a mobile device as belonging to a lifestyle profile.

10. The method of claim 1, further comprising transmitting a message to at least one of the mobile devices based on at least one of the resulting plurality of profiles.

11. A computer program product for generating profiles based on mobile device data, the computer program product comprising:

one or more computer-readable tangible storage devices and program instructions stored on at least one of the one or more storage devices, the program instructions comprising:
  program instructions to receive a plurality of mobile device records of a plurality of mobile devices in a region, wherein each of the plurality of mobile device records includes a timestamp, includes a location data, and includes an activity data;
  program instructions to assign each of the plurality of mobile device records to one of a plurality of space-time boxes each having at least two spatial dimensions and a temporal dimension;
  program instructions to perform one or more analytics on the plurality of mobile device records assigned to the plurality of space-time boxes to yield a resulting plurality of profiles, wherein the plurality of profiles are created based on the plurality of space-time boxes to which the plurality of mobile device records are assigned.

12. The computer program product of claim 11, further comprising:
  program instructions to increase the size of at least one dimension of at least one of the plurality of space-time boxes; and
  program instructions to generate activity counts for each space-time box per mobile device record of the plurality of mobile device records, wherein the plurality of profiles are further based on the activity counts.

13. The computer program product of claim 11, further comprising:
  program instructions to normalize at least one of the resulting plurality of profiles; and
  program instructions to rank the plurality of mobile device records by frequencies of appearance of other mobile devices.

14. The computer program product of claim 11, further comprising:
  program instructions to tag each of the plurality of mobile device records with a metadata tag that includes a span; and
  program instructions to group the plurality of mobile device records by mobile device location and the metadata tag.

15. The computer program product of claim 11, wherein at least one of the resulting plurality of profiles includes a mobility profile indicating the number of locations in the region that each mobile device occupies during a span.

16. The computer program product of claim 11, wherein at least one of the resulting plurality of profiles includes a hangout profile indicating the number of mobile devices that occupy each location in the region during a span.

17. The computer program product of claim 11, wherein at least one of the resulting plurality of profiles includes a buddy profile indicating the mobile devices that occupy the same location in the region as a given mobile device.

18. The computer program product of claim 11, further comprising program instructions to apply a heuristic rule to at least one of the resulting plurality of profiles to identify a mobile device as belonging to a lifestyle profile.

19. The computer program product of claim 1, further comprising program instructions to apply a clustering rule to at least one of the resulting plurality of profiles to identify a mobile device as belonging to a lifestyle profile.

20. A system for generating profiles based on mobile device data, the system comprising:
  one or more processors, one or more computer-readable memories, one or more computer-readable tangible storage devices, and program instructions stored on at least one of the one or more storage devices for execution by at least one of the one or more processors via at least one of the one or more memories, the program instructions comprising:
  program instructions to receive a plurality of mobile device records of a plurality of mobile devices in a region, wherein each of the plurality of mobile device records includes a timestamp, includes a location data, and includes an activity data;
  program instructions to assign each of the plurality of mobile device records to one of a plurality of space-time boxes each having at least two spatial dimensions and a temporal dimension;
  program instructions to perform one or more analytics on the plurality of mobile device records assigned to the plurality of space-time boxes to yield a resulting plurality of profiles, wherein the plurality of profiles are created based on the plurality of space-time boxes to which the plurality of mobile device records are assigned.

* * * * *